US007359578B2

(12) United States Patent
Okamoto

(10) Patent No.: US 7,359,578 B2
(45) Date of Patent: Apr. 15, 2008

(54) INFORMATION PROCESSING APPARATUS, AND PROGRAM, COMPUTER READABLE MEDIUM, AND METHOD FOR SEARCHING FOR IMAGE DATA

(75) Inventor: Akihiko Okamoto, Tokyo (JP)

(73) Assignee: Ricoh Company, Ltd. (JP)

( * ) Notice: Subject to any disclaimer, the term of this patent is extended or adjusted under 35 U.S.C. 154(b) by 820 days.

(21) Appl. No.: 10/895,943

(22) Filed: Jul. 22, 2004

(65) Prior Publication Data
US 2005/0030382 A1 Feb. 10, 2005

(30) Foreign Application Priority Data
Jul. 25, 2003 (JP) ............................. 2003-201497

(51) Int. Cl.
*G06K 9/60* (2006.01)
(52) U.S. Cl. ....................... 382/305; 382/307; 358/403
(58) Field of Classification Search ................. 382/305, 382/306, 307; 358/403, 404
See application file for complete search history.

(56) References Cited

U.S. PATENT DOCUMENTS

| 5,070,494 A | 12/1991 | Emoto et al. |
| 5,301,179 A | 4/1994 | Okamoto |
| 5,351,228 A | 9/1994 | Kanno et al. |
| 5,568,640 A * | 10/1996 | Nishiyama et al. ............. 707/1 |
| 5,628,003 A * | 5/1997 | Fujisawa et al. ......... 707/104.1 |
| 5,787,063 A | 7/1998 | Kanno et al. |
| 5,912,870 A | 6/1999 | Kanno et al. |
| 6,137,760 A | 10/2000 | Okamoto |
| RE37,093 E | 3/2001 | Okamoto |
| 6,198,712 B1 | 3/2001 | Okamoto |
| 6,329,035 B1 | 12/2001 | Iwasaki et al. |
| 6,442,555 B1 * | 8/2002 | Shmueli et al. ............. 707/101 |
| 6,522,426 B1 * | 2/2003 | Park ........................... 358/1.9 |
| 6,553,365 B1 * | 4/2003 | Summerlin et al. ............ 707/2 |
| 2002/0191506 A1 | 12/2002 | Okamoto et al. |
| 2003/0105930 A1 | 6/2003 | Okamoto et al. |

FOREIGN PATENT DOCUMENTS

| JP | 11-252288 | 3/2001 |
| JP | 2001-78144 | 3/2001 |

* cited by examiner

*Primary Examiner*—Yosef Kassa
(74) *Attorney, Agent, or Firm*—Dickstein Shapiro LLP

(57) ABSTRACT

Image data is transmitted from an image input apparatus to an information processing apparatus. Specific information (e.g., photographing information) that specifies the image data, and identification information (e.g., a disk name) that identifies an optical disk on which the image data is recorded, are added to the image data. Further, the specific information and the identification information are stored in a storage device. Subsequently, specific information that matches with an input keyword is searched from the specific information stored in the storage device. Then, the searched specific information and the identification information corresponding to the searched specific information are displayed in a list on a display. By performing a keyword adding process and an image searching process, the optical disk containing desired image data can be easily specified. Therefore, desired image data recorded on the optical disk can be easily searched.

16 Claims, 7 Drawing Sheets

INFORMATION PROCESSING APPARATUS, AND PROGRAM, COMPUTER READABLE MEDIUM, AND METHOD FOR SEARCHING FOR IMAGE DATA

CROSS-REFERENCE TO RELATED APPLICATIONS

This application claims priority to Japanese Patent Application No. 2003-201497 filed in the Japanese Patent Office on Jul. 25, 2003, the entire contents of which is hereby incorporated herein by reference.

BACKGROUND OF THE INVENTION

1. Field of the Invention

The present invention relates in general to an information processing apparatus, and a program, a computer readable medium, and a method for searching for image data.

2. Discussion of the Related Art

In a digital camera, an object image is photographed by a solid-state imaging device, such as a charged coupled device (CCD) or the like, and image data of the object image is obtained and digitally recorded in a storage medium, such as a flash memory, and a memory card, which is built in the digital camera. Recently, a large-capacity storage medium has been developed, and one storage medium stores about 100 through 1000 files of image data. Generally, such image data stored in a storage medium is loaded into a memory of a computer, and is then edited and displayed.

Usually, the image data of an object image photographed by the above-described digital camera, is stored in the order of photographing in a memory of a computer or an optical storage medium, such as a CD, and a DVD. In this condition, it may require a lot of time and effort for an operator to arrange and search for image data of photographed images in the memory of the computer or the optical storage medium after photographing.

To address this problem, Published Japanese patent application No. 2001-78144 describes a digital camera and an image data storage method in which the arrangement of photographed image data after photographing is not required by designating in advance a storage area of the photographed image data in the digital camera. According to the technique described in Published Japanese patent application No. 2001-78144, additional information used for arranging the photographed image data is stored in a memory of the digital camera before photographing.

Thus, it is desirable to provide an information processing apparatus, and a program, a computer readable medium, and a method for easily searching for image data recorded on a storage medium.

BRIEF SUMMARY OF THE INVENTION

According to an aspect of the present invention, an information processing apparatus is configured to be connected to an image input apparatus that generates image data and to an information recording apparatus that records various types of data on a storage medium. The information processing apparatus includes a storage device configured to store information, an image data receiving mechanism configured to receive image data transmitted from the image input apparatus, an information accepting mechanism configured to accept an input of specific information that specifies the image data received by the image data receiving mechanism and an input of identification information that identifies the storage medium, an information adding mechanism configured to add the specific information and the identification information accepted by the information accepting mechanism to the image data received by the image data receiving mechanism, an image data recording mechanism configured to cause the image data with the specific information and the identification information added by the information adding mechanism to be recorded on the storage medium by the information recording apparatus, and an information management mechanism configured to manage and store the specific information, and the identification information that identifies the storage medium on which the image data with the specific information and the identification information are recorded, in the storage device.

The information processing apparatus further includes a keyword accepting mechanism configured to accept an input of a keyword, an information searching mechanism configured to search for the specific information stored in the storage device by the information management mechanism, which matches the keyword accepted by the keyword accepting mechanism, and a search result notifying mechanism configured to notify an operator of the information processing apparatus of the searched specific information together with the identification information that corresponds to the searched specific information.

The specific information may include photographing information of the image data of a photographed image.

The specific information may include a contracted image of the image data.

The identification information may include a name of the storage medium.

The image data recording mechanism may be configured to cause the image data with the specific information and the identification information to be recorded on the storage medium by the information recording apparatus, when an amount of the image data received by the image data receiving mechanism reaches a storage capacity of the storage medium.

According to another aspect of the present invention, a computer program product is stored on a computer readable storage medium for carrying out a method. The method includes the steps of receiving image data transmitted from an image input apparatus that generates image data, accepting an input of specific information that specifies the received image data and an input of identification information that identifies a storage medium, adding the specific information and the identification information to the image data, recording the image data with the specific information and the identification information on the storage medium by an information recording apparatus, and storing the specific information, and the identification information that identifies the storage medium on which the image data with the specific information and the identification information are recorded, in a storing device.

The recording step may include recording the image data with the specific information and the identification information on the storage medium by the information recording apparatus, when an amount of the received image data reaches a storage capacity of the storage medium.

The method further includes the steps of accepting an input of a keyword, searching for the specific information stored in the storage device, which matches the accepted keyword, and notifying an operator of an information processing apparatus of the searched specific information together with the identification information that corresponds to the searched specific information.

According to another aspect of the present invention, a computer readable medium stores computer instructions for performing the above-described method.

According to yet another aspect of the present invention, an image data searching method includes the steps of receiving image data transmitted from an image input apparatus that generates image data, accepting an input of specific information that specifies the received image data and an input of identification information that identifies a storage medium, adding the specific information and the identification information to the image data, recording the image data with the specific information and the identification information on the storage medium by an information recording apparatus, and storing the specific information, and the identification information that identifies the storage medium on which the image data with the specific information and the identification information are recorded, in a storing device.

The method further includes the steps of accepting an input of a keyword, searching for the specific information stored in the storage device, which matches the accepted keyword, and notifying an operator of an information processing apparatus of the searched specific information together with the identification information that corresponds to the searched specific information.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
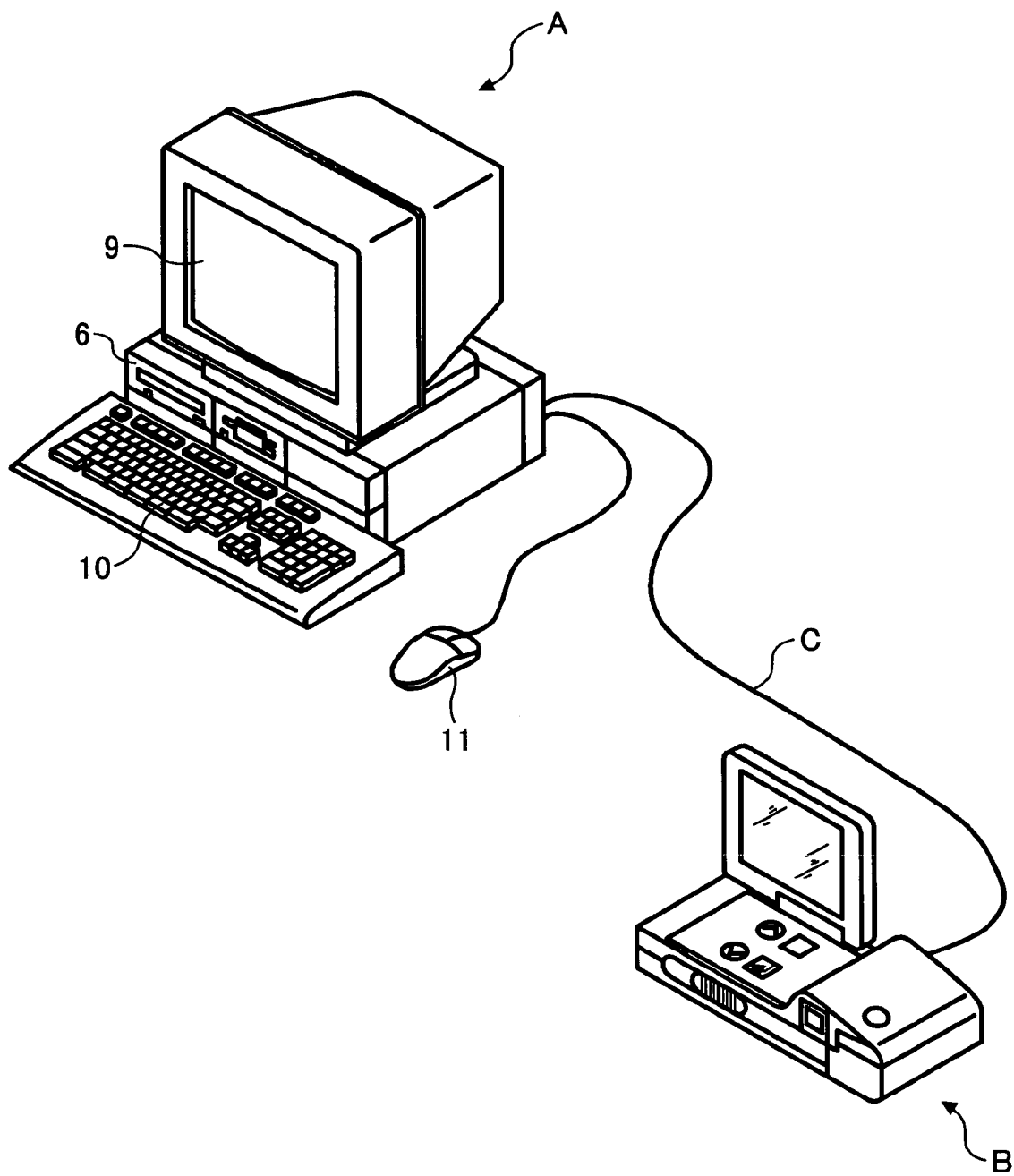
FIG. 1 is a schematic view of a system according to an embodiment of the present invention.

Preferred embodiments of the present invention are described in detail referring to the drawings, wherein like reference numerals designate identical or corresponding parts throughout the several views.

FIG. 1 is a schematic view of a system according to an embodiment of the present invention. As illustrated in FIG. 1, in the system of the present embodiment, an information processing apparatus, such as a personal computer A (hereafter referred to as a "computer") and an image input apparatus, such as a digital camera B, are connected to each other via a communication cable C, such as a universal serial bus (USB).

Figure 2:
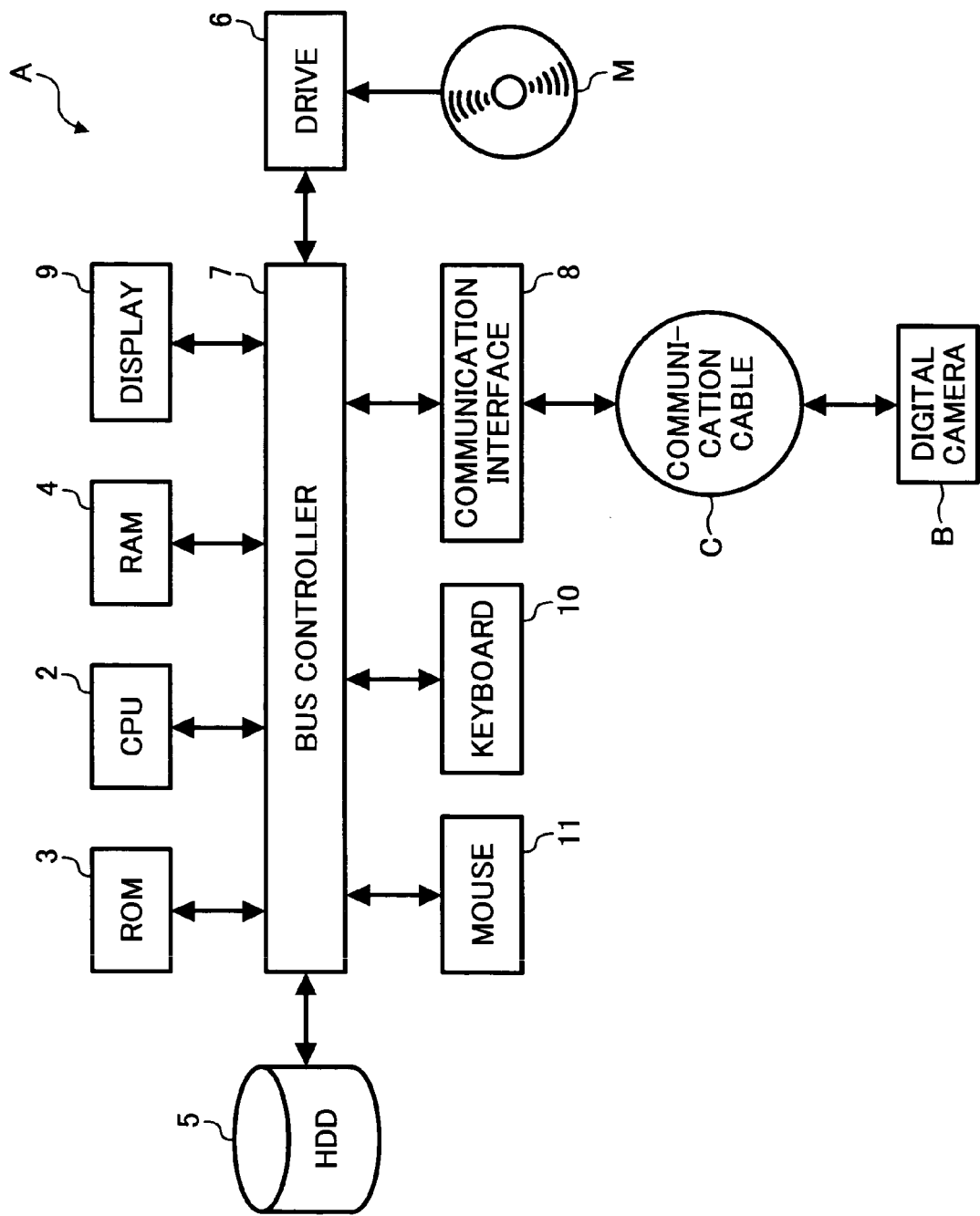
FIG. 2 is a block diagram of a hardware of a computer according to an embodiment of the present invention.

First, the computer A will be described. FIG. 2 is a block diagram of a hardware of the computer A. The computer A includes a central processing unit (CPU) 2, a read only memory (ROM) 3, a random access memory (RAM) 4, a hard disk drive (HDD) 5, a drive 6, a communication interface 8, a display 9, a keyboard 10, and a mouse 11. The CPU 2 performs information processing. The ROM 3 stores, for example, a basic input output system (BIOS). The RAM 4 functions as a storage unit that temporarily stores information during information processing. The HDD 5 functions as a storage unit that stores, for example, processing results. The drive 6 functions as an information recording apparatus that records various types of data on a storage medium, such as a removable media M. The removable media M is used for storing, distributing, or obtaining information. The communication interface 8 is connected to the communication cable C for connection to the digital camera B. The display 9 displays a processing process and a processing result for an operator. The keyboard 10 and the mouse 11 function as an input device. An operator inputs commands and information to the computer A via the keyboard 10 and the mouse 11. A bus controller 7 arbitrates data communications among the above-described devices of the computer A. The communication interface 8 may be also used for connection to a printer (not shown). The connection of the communication interface 8 may be a wireless connection using infrared data communication, instead of a cable connection using a communication line, such as the communication cable C (e.g. a USB cable).

Non-limiting examples of the removable media M include a magnetic storage medium, such as a flexible disk, a hard disk, and a magnetic tape; an optical magnetic storage medium, such as a magneto-optical (MO) disk; an optical storage medium, such as a CD, CD-ROM, CD-R, CD-RW, DVD-ROM, DVD-R, DVD-RAM, DVD-RW, and DVD+RW; and a semiconductor memory.

In data transmission, the communication interface 8 of the computer A outputs signals to the communication cable C by transmitting data to the communication interface 8. The signals received by the communication interface 8 are judged if data is necessary or not. If it is necessary, the data is loaded into the computer A. If it is not necessary, the data is abandoned. Thus, the transmission and receipt of all data are performed via the communication interface 8.

When an operator turns on the computer A, the CPU 2 causes a program named "loader" included in a basic input output system (BIOS) in the ROM 3 to run, and loads an operating system, which is a program for managing a hardware and a software of the computer A, into the RAM 4 from the HDD 5. Upon starting the operating system, the operating system supports the run of application programs, the load and storage of information according to an operation of the operator. The most major operating system is sold under the trademark Windows made by Microsoft Corporation. The programs running on the operating system are so-called application programs.

Figure 3:
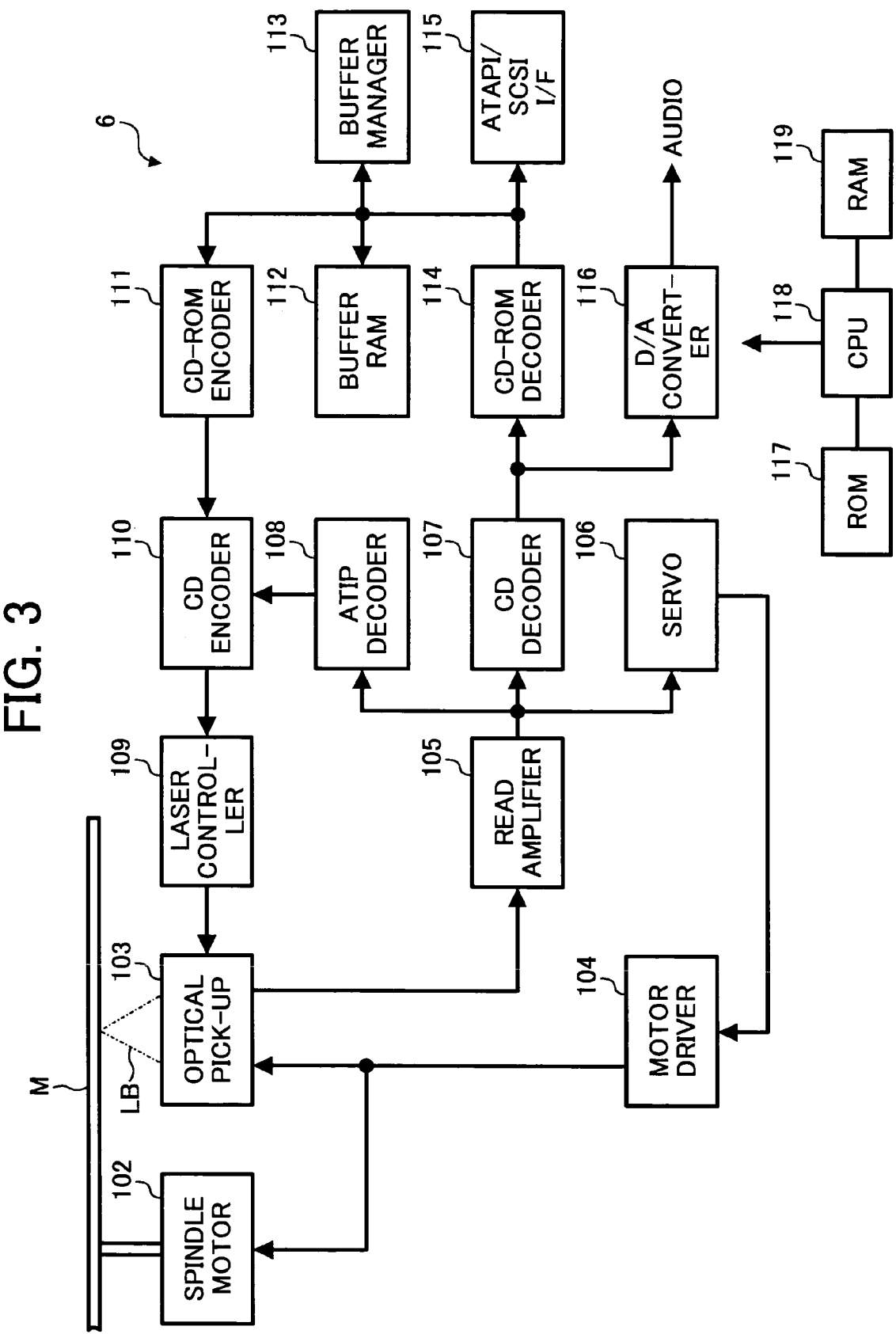
FIG. 3 is a functional block diagram of a drive according to an embodiment of the present invention.

Next, the drive 6 for the removable medium M will be described. FIG. 3 is a functional block diagram of the drive 6. The drive 6 optically records and reproduces information data on and from the removable medium M. The drive 6 includes a spindle motor 102, an optical pick-up 103, a motor driver 104, a read amplifier 105, a servo 106, a CD decoder 107, an ATIP decoder 108, a laser controller 109, a CD encoder 110, a CD-ROM encoder 111, a buffer RAM 112, a buffer manager 113, a CD-ROM decoder 114, an ATAPI/SCSI interface 115, a D/A converter 116, a ROM 117, a CPU 118, and a RAM 119. A term "M" in FIG. 3 indicates an optical disk, a term "LB" indicates a laser light beam, and a term "Audio" indicates an audio output signal.

In FIG. 3, arrows indicate the direction of data flow. To simplify the diagram, the CPU 118 which controls each functional block in FIG. 3 is connected only by a thick line and the connections with each of the functional blocks are not shown.

The CPU 118, the ROM 117, and the RAM 119 form a microcomputer. A readable control program for the CPU 118 is stored in the ROM 117. The ROM 117 further stores data required to be stored for a long period of time, such as control parameters for various types of media. When turning on a power supply of the drive 6, the control program is loaded into a main memory (not shown). The CPU 118 controls operations in each of the blocks according to the control program, and temporarily stores data necessary for controlling the blocks in the RAM 119. Alternatively, if the RAM 119 is a battery-backed-up nonvolatile RAM, the control program may be stored in the RAM 119.

In the drive 6, the optical disk M is rotated by the spindle motor 102. The spindle motor 102 is controlled to a constant linear velocity (CLV) or to a constant angular velocity (CAV), by the motor driver 104 and the servo circuit 106. It is possible to change the linear velocity or the angular velocity in phase. The optical pick-up 103 includes a semi-conductor laser, an optical system, a focus actuator, a track actuator, a photo detector, and a position sensor, all of which are not shown. The semi-conductor laser emits a laser beam "LB" to a recording surface of the optical disk M.

The optical pick-up 103 is configured to be moved in a sledge direction (i.e., a radial direction of the optical disk M) by a seek motor (not shown). The focus actuator, the track actuator, and the seek motor are controlled to locate a light spot of the laser beam "LB" at a desired position on the optical disk M by using the motor driver 104 and the servo circuit 106 based on signals from the photo detector and the position sensor of the optical pick-up 103.

When reproducing data, a reproducing signal obtained from the optical pick-up 103 is amplified by the read amplifier 105 to convert into binary data. The binary data is input to the CD decoder 107, where de-interleave and error correction are carried out. The CD decoder 107 performs an EFM (Eight to Fourteen bit Modulation) to decode the binary data into decoded data. Recorded data in the optical disk M is modulated in EFM that is summed up 8 bits at a time. It is converted 8 bits to 14 bits and then to 17 bits by adding 3 coupling bits in an EFM process. In this case, the coupling bits are added to equalize the numbers of "1" and "0" on average as a whole. This process is referred to as "suppression of DC elements", and suppresses slice level fluctuations in DC cut reproduction signals.

Decoded data is de-interleaved and error-corrected. Subsequently, the data is input to the CD-ROM decoder 114 and subjected to an additional error-correction to improve data reliability. Then, the data is stored in the buffer RAM 112 once by the buffer manager 113. If the stored data gets into sector datum, the sector datum is transferred to the computer A through the ATAPI/SCSI interface 115 as a sector datum unit. In the case of audio data, data output from the CD decoder 107 is input to the D/A converter 116 and is output as analog audio output signals.

When recording data, data is transferred from the computer A to the drive 6 through the ATAPI/SCSI interface 115 and the data is stored in the buffer RAM 112 once by the buffer manager 113. A writing process is started by storing a certain level of data in the buffer RAM 112. Before writing data on the optical disk M, the laser spot needs to be set in a write start position. This position is searched with a wobble signal provided on the optical disk M as track grooves.

The wobble signal contains information on absolute time referred to as ATIP (Absolute Time In Pre-groove). The information on absolute time is obtained from the ATIP decoder 108. A synchronization signal generated by the ATIP decoder 108 is input to the CD encoder 110, and this signal makes it possible to write data into an accurate position on the optical disk M. Error-correction codes are added to the data in the buffer RAM 112, and the data is interleaved in the CD-ROM encoder 111 and the CD encoder 110, before data is written in the optical disk M through the laser controller 109 and the optical pick-up 103.

The EFM modulated data, as bit streams, drives the laser at a channel bit rate of 4.3218 Mbps (a standard speed). In this case, the recorded data makes up an EFM frame per 588 channel bits unit. A channel clock means a clock in a frequency of the channel bits.

In an alternative configuration of the drive 6, address information may be obtained by land prepits and prepits.

Figure 4:
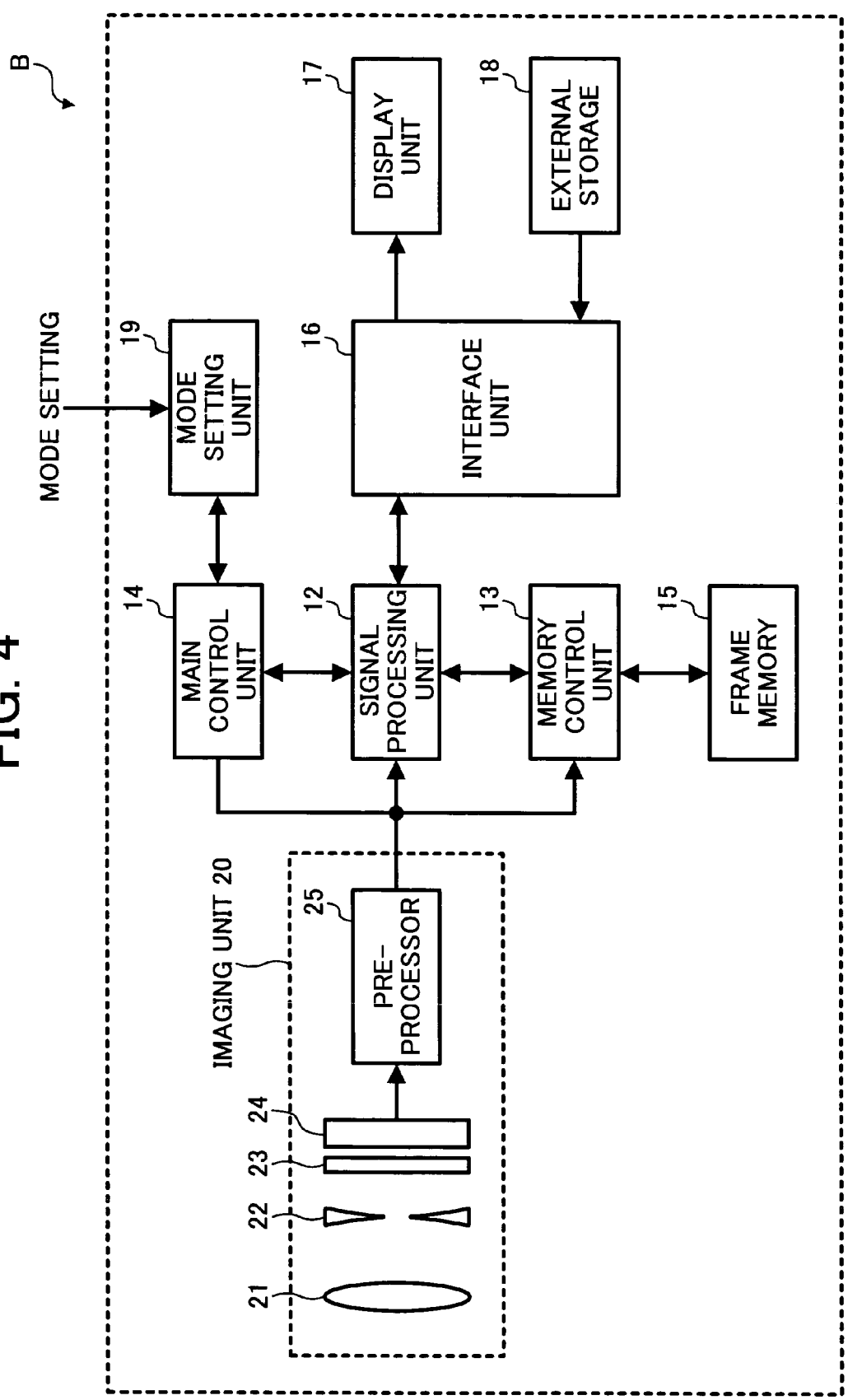
FIG. 4 is a block diagram of a hardware configuration of a digital camera according to an embodiment of the present invention.
Figure 5:
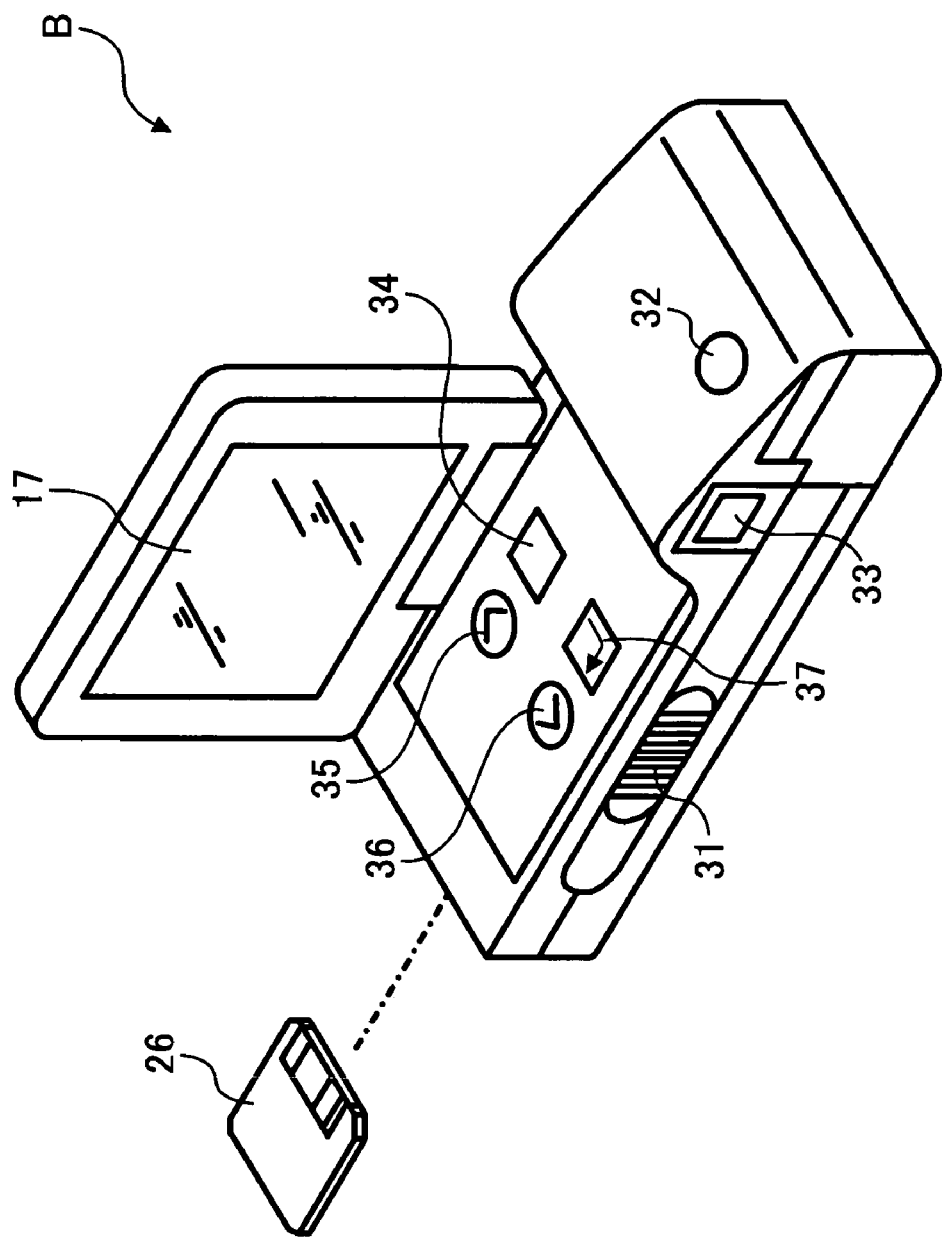
FIG. 5 is a schematic perspective view of the digital camera.

Next, the digital camera B functioning as an image input apparatus will be described. FIG. 4 is a block diagram of a hardware configuration of the digital camera B. FIG. 5 is a schematic perspective view of the digital camera B.

As shown in FIG. 4, the digital camera B includes a signal processing unit 12, a memory control unit 13, a main control unit 14, a frame memory 15, an interface unit 16, a display unit 17, an external storage 18, a mode setting unit 19, and an imaging unit 20. The imaging unit 20 includes a lens 21, an aperture 22, a shutter 23, a photoelectric conversion unit 24, and a pre-processor 25.

In the imaging unit 20, an output of the pre-processor 25 is connected to the signal processing unit 12. The signal processing unit 12 is connected to each of the main control unit 14, the memory control unit 13, and the interface unit 16. The memory control unit 13 is connected to the frame memory 15. The main control unit 14 is connected to each of the memory control unit 13 and the mode setting unit 19. The frame memory 15 is connected to the memory control unit 13. The interface unit 16 is connected to each of the display unit 17 and the external storage 18.

In the imaging unit 20, the lens 21, the aperture 22, the shutter 23, and the photoelectric conversion unit 24 are arranged in this order along the optical axis thereof. An output of the photoelectric conversion unit 24 is connected to the pre-processor 25.

In the present embodiment, the photoelectric conversion unit 24 of the imaging unit 20 is formed by using, for example, a charge-coupled device (CCD). The pre-processor 25 includes an analog signal processor or analog-to-digital converter including a preamplifier and an automatic gain control (AGC) circuit. The pre-processor 25 serves to convert an analog image signal, supplied by the photoelectric conversion unit 24, into a digital image signal.

In the present embodiment, the signal processing unit 12 is formed by using a digital signal processor (DSP) or the like, and has an image compression function. The digital image signal, supplied by the imaging unit 20, is subjected to several kinds of signal processing, such as color decomposition, white balance adjustment, and gamma correction, in the signal processing unit 12. The memory control unit 13 controls the frame memory 15 such that the processed image signal, supplied by the signal processing unit 12, is written to the frame memory 15, or, conversely, it is read from the frame memory 15. In the present embodiment, the frame memory 15 is formed by a semiconductor memory, such as a VRAM, SRAM or DRAM. The frame memory 15 is capable of storing an amount of image signals corresponding to at least two images of an object. The main control unit 14 includes a microcomputer constructed from a CPU that intensively controls each unit of the digital camera B, a ROM that stores various kinds of control programs used by the CPU, and a RAM used as a work area. Instead of executing the control program stored in the ROM, a memory medium 26 (shown in FIG. 5) storing a control program may be installed on the digital camera B, and the CPU of the main control unit 14 of the digital camera B may execute the control program stored in the memory medium 26.

In the digital camera B, an image signal, read from the frame memory 15, is transferred to the signal processing unit 12. In the signal processing unit 12, the image signal is processed through image compression and other signal processing. After the signal processing is performed, the signal processing unit 12 transfers the compressed image signal to the external storage 18 via the interface 16 for storage of the image signal. The external storage 18 reads and writes various signals, such as image signals, which are supplied thereto via the interface 16. In the present embodiment, the external storage 18 is formed from an IC memory card or a magneto-optical disk. Alternatively, by using a modem card or an ISDN card, the compressed image signal may be transmitted to an external terminal at a remote location via a communication network, where the compressed image signal is recorded to a recording medium of the terminal, instead of storing it in the external storage 18.

On the other hand, the compressed image signal read from the external storage 18 is transferred to the signal processing unit 12 via the interface 16. In the signal processing unit 12, the image signal is processed through signal decompression and other signal processing.

Further, in the digital camera B, an image signal read from either the external storage 18 or the frame memory 15 is transferred to the signal processing unit 12. In the signal processing unit 12, the image signal is processed through digital-to-analog (DA) conversion, amplification, and/or other kinds of signal processing. After the signal processing is performed, the processed image signal is transferred to the display unit 17 via the interface 16, so that the image is displayed on the display unit 17. In the present embodiment, the display unit 17 is formed by, for example, a liquid crystal display (LCD) device attached to a case of the digital camera B.

As shown in FIG. 5, the digital camera B includes a power switch 31, a shutter 32, a finder 33, a mode setting key 34, an up scroll key 35, a down scroll key 36, and an enter key 37, in addition to the elements of the digital camera B described above with reference to FIG. 4. The mode setting key 34 is provided for the user to select one of a normal imaging mode and a distortion correcting mode, and a mode setting signal (MS) indicating the user's selection on the mode setting key 34 is supplied to the mode setting unit 19. The up scroll key 35 is provided for the user to scroll up the image displayed on the display unit 17. The down scroll key 36 is provided for the user to scroll down the image displayed on the display unit 17.

The processes executed by the signal processing unit 12 include an additional information generating process for generating additional information given to the data of an image photographed by the digital camera B. The additional information generated in the additional information generating process may include any desired information, such as a camera manufacturer, a model of camera, and a photographing date and time.

Figure 6:
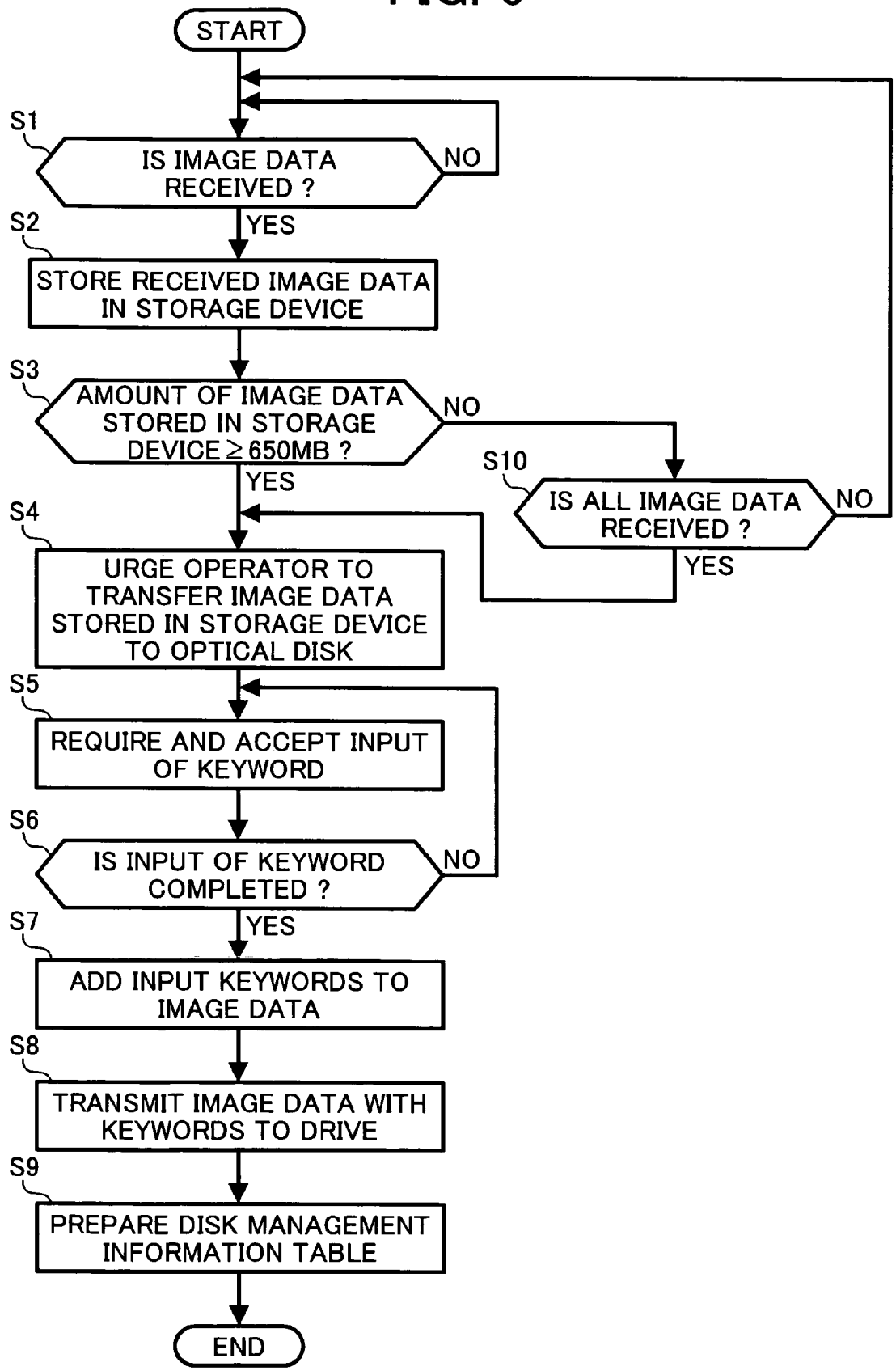
FIG. 6 is a flowchart of keyword adding process control operation steps of a CPU according to an embodiment of the present invention.

Next, a characteristic function of the computer A will be described. The computer A performs a keyword adding process for adding keywords to the data of an image photographed by the digital camera B while the CPU 2 of the computer A follows an application program running on an operation system. FIG. 6 is a flowchart of keyword adding process control operation steps of the CPU 2 according to an embodiment of the present invention.

First, the CPU 2 determines if the CPU 2 receives received image data transmitted from the digital camera B via the communication interface 8 in step S1. In step S1, the CPU 2 functions as an image data receiving mechanism configured to receive the image data transmitted from the image input apparatus (i.e., the digital camera B). If the CPU 2 does not receive image data from the digital camera B (i.e., the answer is NO in step S1), the keyword adding process control operation returns to reexecute step S1. If the CPU 2 receives image data (i.e., the answer is YES in step S1), the CPU 2 stores the received image data in the HDD 5 functioning as a storage device in step S2. At this time, the CPU 2 monitors an amount of image data stored in the HDD 5. Specifically, the CPU 2 determines if the amount of image data stored in the HDD 5 reaches a predetermined amount, for example, about 650 MB that corresponds to a storage capacity of the optical disk M, such as a CD-R, and a CD-RW, in step S3. If the optical disk M is a DVD, the CPU 2 determines if the amount of image data stored in the HDD 5 reaches about 4.7 GB or about 9.4 GB.

If the CPU 2 determines that the amount of image data stored in the HDD 5 reaches a predetermined amount (e.g., about 650 MB) (i.e., the answer is YES in step S3), the CPU 2 causes the display 9 to display a message, such as "data having an amount equal to a storage capacity of one optical disk has been stored", and urges the operator to transfer the image data stored in the HDD 5 to the optical disk M, such as a CD-R, and a CD-RW, in step S4. Subsequently, the CPU 2 requires and accepts the input of a keyword to be added to the image data which is transferred from the HDD 5 to the optical disk M in step S5.

Non-limiting examples of the keyword include photographing information, such as a photographing date and time, a photographing location, and an object (e.g., a name of a person, a name of a substance, etc.), and a disk name (e.g., 001, 002, . . . ) of the optical disk M. The photographing information such as a photographing date and time, which was added to the data of the photographed image as additional information in the above-described additional information generating process executed in the digital camera B, is used as a keyword. The photographing information, such as a photographing location and an object, is input by an operator with an input device, such as the keyboard 10, and the mouse 11. If using a digital camera in which keywords are added to image data at the time of photographing, such keywords may be used without inputting them by the input device.

Particularly, the photographing information, such as photographing date and time, a photographing location, and an object (e.g., a name of a person, a name of a substance, etc.), equals specific information that specifies image data, and the information of a disk name of the optical disk M equals identification information that identifies a storage medium. In step S5, the CPU 2 functions as an information accepting mechanism configured to accept an input of the specific information that specifies image data and an input of the identification information that identifies a storage medium.

In step S6, the CPU 2 determines if the input of the keyword to be added to the image data which is transferred from the HDD 5 to the optical disk M is completed. If the answer is NO in step S6, the keyword adding process control operation returns to reexecute step S5. If the answer is YES in step S6, the CPU 2 adds the input keywords to each image data or a data file containing all image data in step S7. In step S7, the CPU 2 functions as an information adding mechanism configured to add the specific information and the identification information to image data. Subsequently, the CPU 2 transmits the image data with the keywords to the drive 6 in step S8. By doing so, the image data with the keywords is recorded on the optical disk M, such as a CD-R, and a CD-RW, in the drive 6. In step S8, the CPU 2 functions as an image data recording mechanism configured to cause the image data with the specific information and the identification information to be recorded on the storage medium by the information recording apparatus (i.e., the drive 6).

Subsequently, the CPU 2 prepares a disk management information table containing the keywords which have been input in step S5, and stores the disk management information table in the RAM 4 and the HDD 5 functioning as a storage device in step S9. The disk management information table may contain a contracted image (i.e., a thumbnail image) of image data together with the keywords. In step S9, the CPU functions as an information management mechanism configured to manage and store the specific information, and the identification information that identifies the storage medium on which the image data with the specific information and the identification information are recorded, in the storage device.

Figure 7:
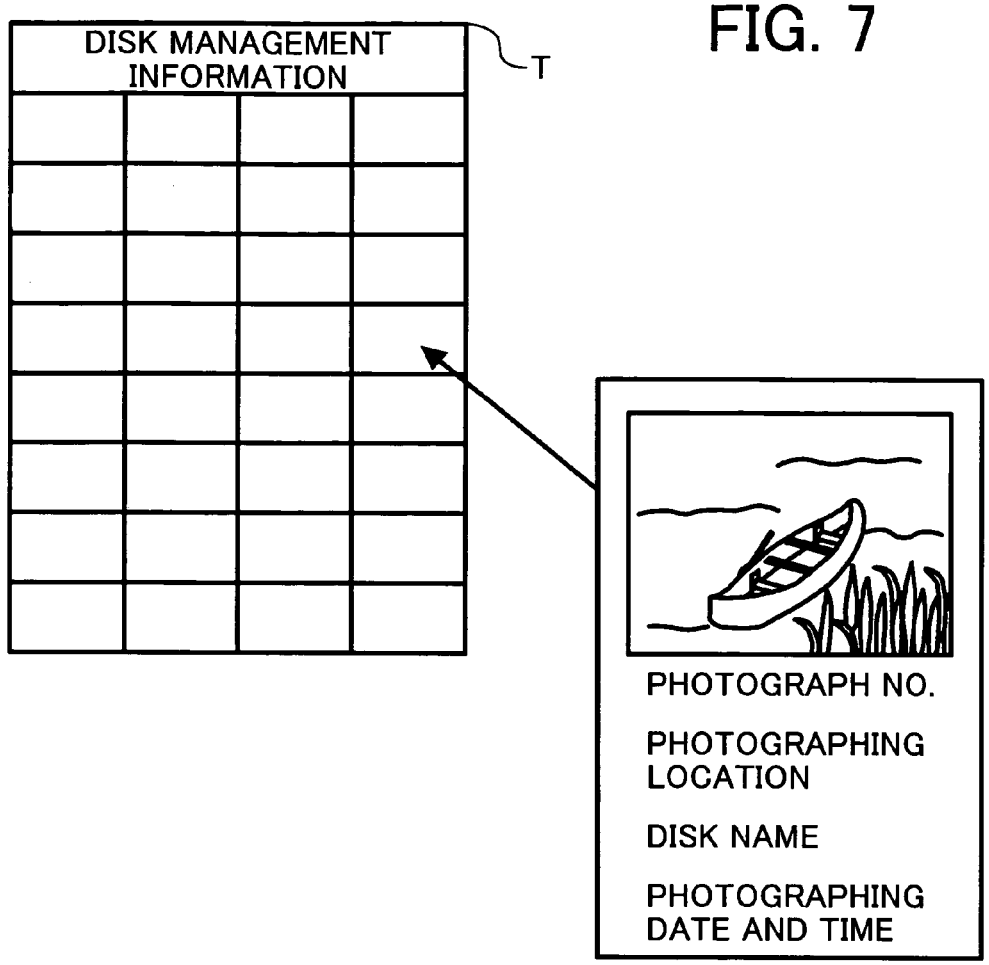
FIG. 7 is an illustration for explaining a disk management information table.

FIG. 7 is an illustration for explaining a disk management information table. As illustrated in FIG. 7, a disk management information table T contains a thumbnail image of image data together with keywords, such as a photograph number, a photographing location, a disk name of the optical disk M, and photographing date and time.

If the CPU 2 determines that the amount of image data stored in the HDD 5 does not reach a predetermined amount, for example, about 650 MB (i.e., the answer is NO in step S3), the CPU 2 further determines if all image data is received from the digital camera B in step S10. If the answer is YES in step S10, the CPU 2 performs the keyword adding process control operation steps S4 through S9. If the answer is NO in step S10, the keyword adding process control operation returns to reexecute step S1.

Figure 8:
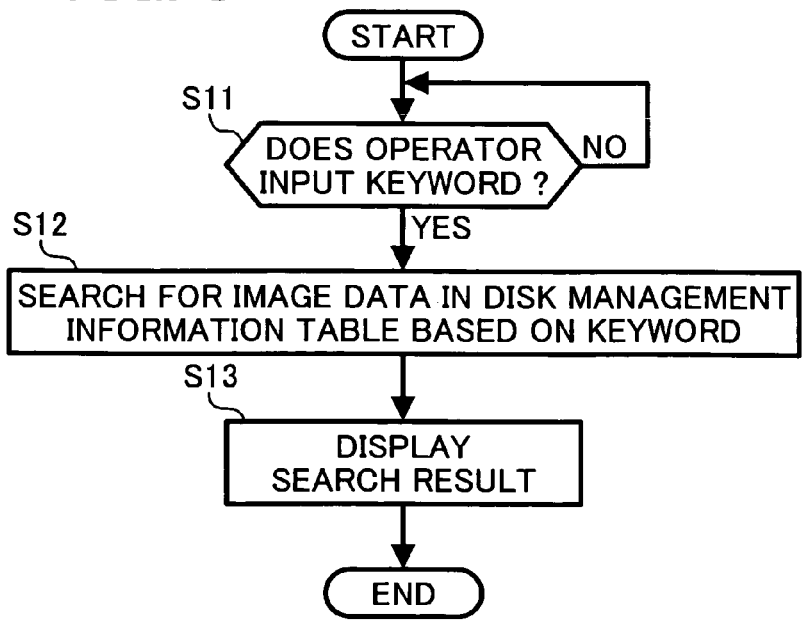
FIG. 8 is a flowchart of image searching process control operation steps of the CPU according to an embodiment of the present invention.

The computer A performs an image searching process for searching for an image based on the keyword, which was added to the image data photographed by the digital camera B in the above-described keyword adding process, while the CPU 2 of the computer A follows an application program running on an operation system. FIG. 8 is a flowchart of image searching process control operation steps of the CPU 2 according to an embodiment of the present invention.

Referring to FIG. 8, the CPU 2 determines if an operator inputs a keyword, such as photographing date and time (e.g., around August, 2002), and a photographing location (e.g., Kamakura), with the input device, such as the keyboard 10 and the mouse 11 in step S11. In step S11, the CPU 2 functions as a keyword accepting mechanism configured to accept an input of a keyword. If the answer is YES in step S11, the CPU 2 searches for image data in the disk management information table T in step S12, which was prepared in the keyword adding process, based on the keyword input by the operator in steps S5-S9. In step S12, the CPU 12 functions as an information searching mechanism configured to search for the specific information stored in the storage device, which matches the keyword input by the operator. If the answer is NO in step S11, the image searching process control operation returns to reexecute step S11. Then, in step S13, the CPU 2 displays a list of the numbers (i.e., photograph numbers) of the image data that match the keyword and the disk names of the optical disk M on the display 9. In step S13, the CPU 2 functions as a search result notifying mechanism configured to notify an operator of the searched specific information together with the identification information that corresponds to the searched specific information. If thumbnail images of image data are contained in the disk management information table T with keywords, the CPU 2 may also display thumbnail images of the image data that match the keywords on the display 9.

Thus, in a condition in which image data that matches keywords is displayed in a list, the disk name of the optical disk M that stores desired images can be retrieved. Then, an operator can display the desired images on the display 9 by installing the optical disk M of the disk name containing the desired images into the drive 6. After displaying the desired images on the display 9, the images are subjected to various types of processing, such as printing processing, and image editing processing, if necessary.

As an alternative example, the disk management information table T may be printed by using a printer, and prints may be brought together like a book. An operator may find a desired image while looking at the prints.

As another alternative example, the disk management information table T may be printed by using a printer, and the print may be put into a transparent disk case that accommodates the optical disk M or may be attached onto the disk case with a seal. In this case, an operator may recognize the contents of the image data of the optical disk M just by looking at the case.

Further, as another alternative example, the disk management information table T may be printed on a surface of the optical disk M on the side opposite to a recording surface. By coating the surface of the optical disk M with erasable thermochromisum, thermosensitive material, or photochromisum, the disk management information table T can be erased, revised, and repeatedly printed on the surface of the optical disk M, such as, for example, a CD-RW.

In the above-described embodiment of the present invention, image data is transmitted from the digital camera B to the computer A. Further, the specific information, for example, the photographing information, such as photographing date and time, a photographing location, and an object (e.g., a name of a person, a name of a substance, etc.) which specifies the image data and the identification information, for example, the name of the optical disk M, which identifies the optical disk M on which the image data is recorded, are added to the image data. Further, the specific information and the identification information are stored in the storage device, for example, the RAM 4 and the HDD 5. Subsequently, the specific information that matches with the input keyword is searched from the specific information stored in the RAM 4 and the HDD 5. Then, the searched specific information and the identification information that corresponds to the searched specific information are displayed in a list on the display 9. By performing the above-described keyword adding process and image searching process, the optical disk M containing desired image data can be easily specified. Therefore, desired image data recorded on the optical disk M can be easily searched.

When searching the specific information stored in the RAM 4 and the HDD 5, the specific information may be searched in an electronic way or a visual way. If searching the specific information visually, the specific information and the identification information may be printed or displayed for recognizing by an operator's eyes as described above.

In the embodiment, the CPU 2 causes the image data with the specific information and the identification information to be recorded on the optical disk M by the drive 6, when an amount of the image data received by the CPU 2 reaches a storage capacity of the optical disk M. Because image data with specific information and identification information is recorded on a storage medium (the optical disk M) from the HDD 5 according to a storage capacity of the storage medium, the number of the storage medium storing the image data with specific information and identification information can be minimized. As a result, the storage medium storing desired image data can be easily searched.

The present invention has been described with respect to the exemplary embodiments illustrated in the figures. However, the present invention is not limited to these embodiments and may be practiced otherwise.

Numerous additional modifications and variations of the present invention are possible in light of the above teachings. It is therefore understood that within the scope of the appended claims, the present invention may be practiced other than as specifically described herein.

What is claimed as new and desired to be protected by Letters Patent of the United States is:

1. An information processing apparatus configured to be connected to an image input apparatus that generates image data and to an information recording apparatus that records various types of data on a storage medium, the information processing apparatus comprising:
    a storage device configured to store information;
    an image data receiving mechanism configured to receive image data transmitted from the image input apparatus;
    an information accepting mechanism configured to accept an input of specific information that specifies the image data received by the image data receiving mechanism and an input of identification information that identifies the storage medium;
    an information adding mechanism configured to add the specific information and the identification information accepted by the information accepting mechanism to the image data received by the image data receiving mechanism;
    an image data recording mechanism configured to cause the image data with the specific information and the identification information added by the information adding mechanism to be recorded on the storage medium by the information recording apparatus; and
    an information management mechanism configured to manage and store the specific information, and the identification information that identifies the storage medium on which the image data with the specific information and the identification information are recorded, in the storage device.

2. The information processing apparatus according to claim 1, wherein the specific information includes photographing information of the image data of a photographed image.

3. The information processing apparatus according to claim 1, wherein the specific information includes a contracted image of the image data.

4. The information processing apparatus according to claim 1, wherein the identification information includes a name of the storage medium.

5. The information processing apparatus according to claim 1, wherein the image data recording mechanism is configured to cause the image data with the specific information and the identification information to be recorded on the storage medium by the information recording apparatus, when an amount of the image data received by the image data receiving mechanism reaches a storage capacity of the storage medium.

6. The information processing apparatus according to claim 1, further comprising:
    a keyword accepting mechanism configured to accept an input of a keyword;
    an information searching mechanism configured to search for the specific information stored in the storage device by the information management mechanism, which matches the keyword accepted by the keyword accepting mechanism; and
    a search result notifying mechanism configured to notify an operator of the information processing apparatus of the searched specific information together with the identification information that corresponds to the searched specific information.

7. An information processing apparatus configured to be connected to an image input apparatus that generates image data and to an information recording apparatus that records various types of data on a storage medium, the information processing apparatus comprising:
    storage means for storing information;
    image data receiving means for receiving image data transmitted from the image input apparatus;
    information accepting means for accepting an input of specific information that specifies the image data received by the image data receiving means and an input of identification information that identifies the storage medium;
    information adding means for adding the specific information and the identification information accepted by the information accepting means to the image data received by the image data receiving means;
    image data recording means for causing the image data with the specific information and the identification information added by the information adding means to be recorded on the storage medium by the information recording apparatus; and
    information management means for managing and storing the specific information, and the identification information that identifies the storage medium on which the image data with the specific information and the identification information are recorded, in the storage means.

8. The information processing apparatus according to claim 7, wherein the specific information includes photographing information of the image data of a photographed image.

9. The information processing apparatus according to claim 7, wherein the specific information includes a contracted image of the image data.

10. The information processing apparatus according to claim 7, wherein the identification information includes a name of the storage medium.

11. The information processing apparatus according to claim 7, wherein the image data recording means causes the image data with the specific information and the identification information to be recorded on the storage medium by the information recording apparatus, when an amount of the image data received by the image data receiving means reaches a storage capacity of the storage medium.

12. The information processing apparatus according to claim 7, further comprising:
   keyword accepting means for accepting an input of a keyword;
   information searching means for searching for the specific information stored in the storage means by the information management means, which matches the keyword accepted by the keyword accepting means; and
   search result notifying means for notifying an operator of the information processing apparatus of the searched specific information together with the identification information that corresponds to the searched specific information.

13. A computer readable medium storing computer instructions for performing a method, the method comprising the steps of:
   receiving image data transmitted from an image input apparatus that generates image data;
   accepting an input of specific information that specifies the received image data and an input of identification information that identifies a storage medium;
   adding the specific information and the identification information to the image data;
   recording the image data with the specific information and the identification information on the storage medium by an information recording apparatus; and
   storing the specific information, and the identification information that identifies the storage medium on which the image data with the specific information and the identification information are recorded, in a storing device.

14. The medium according to claim 13, wherein the recording step comprises recording the image data with the specific information and the identification information on the storage medium by the information recording apparatus, when an amount of the received image data reaches a storage capacity of the storage medium.

15. The medium according to claim 13, the method further comprising the steps of:
   accepting an input of a keyword;
   searching for the specific information stored in the storage device, which matches the accepted keyword; and
   notifying an operator of an information processing apparatus of the searched specific information together with the identification information that corresponds to the searched specific information.

16. An image data searching method, comprising the steps of:
   receiving image data transmitted from an image input apparatus that generates image data;
   accepting an input of specific information that specifies the received image data and an input of identification information that identifies a storage medium;
   adding the specific information and the identification information to the image data;
   recording the image data with the specific information and the identification information on the storage medium by an information recording apparatus;
   storing the specific information, and the identification information that identifies the storage medium on which the image data with the specific information and the identification information are recorded, in a storing device;
   accepting an input of a keyword;
   searching for the specific information stored in the storage device, which matches the accepted keyword; and
   notifying an operator of an information processing apparatus of the searched specific information together with the identification information that corresponds to the searched specific information.

* * * * *